Figure 1:
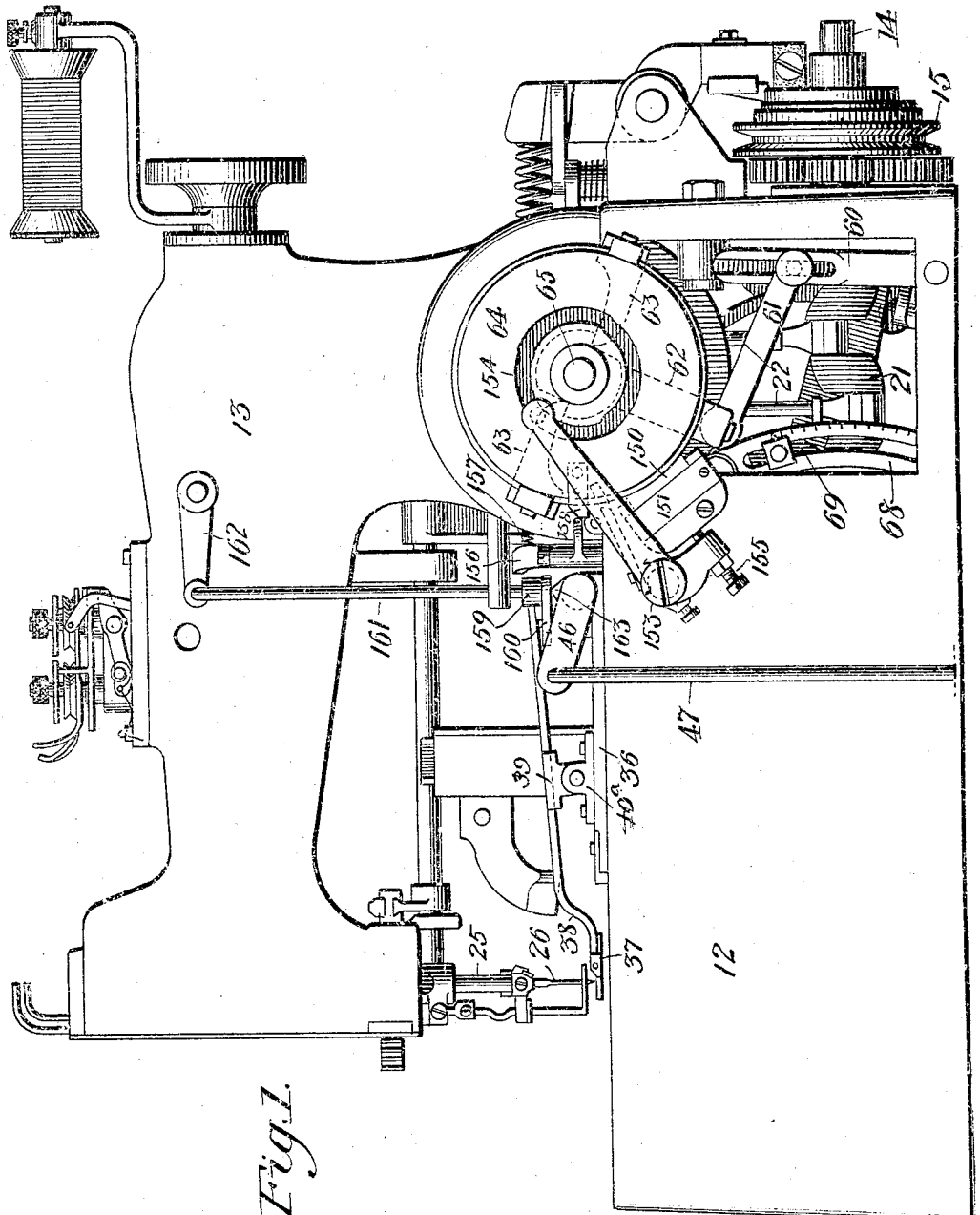

No. 864,117. PATENTED AUG. 20, 1907.
E. B. ALLEN.
WORK HOLDING AND FEEDING DEVICE FOR BUTTONHOLE SEWING MACHINES.
APPLICATION FILED OCT. 30, 1906.

7 SHEETS—SHEET 1.

Witnesses
Inventor
Edward B Allen
By
Attorney

No. 864,117. PATENTED AUG. 20, 1907.
E. B. ALLEN.
WORK HOLDING AND FEEDING DEVICE FOR BUTTONHOLE SEWING MACHINES.
APPLICATION FILED OCT. 30, 1906.

7 SHEETS—SHEET 2.

Witnesses:
O. W. Edelin.
C. M. Sweeney.

Inventor:
Edward B. Allen
By Henry Calver
Attorney

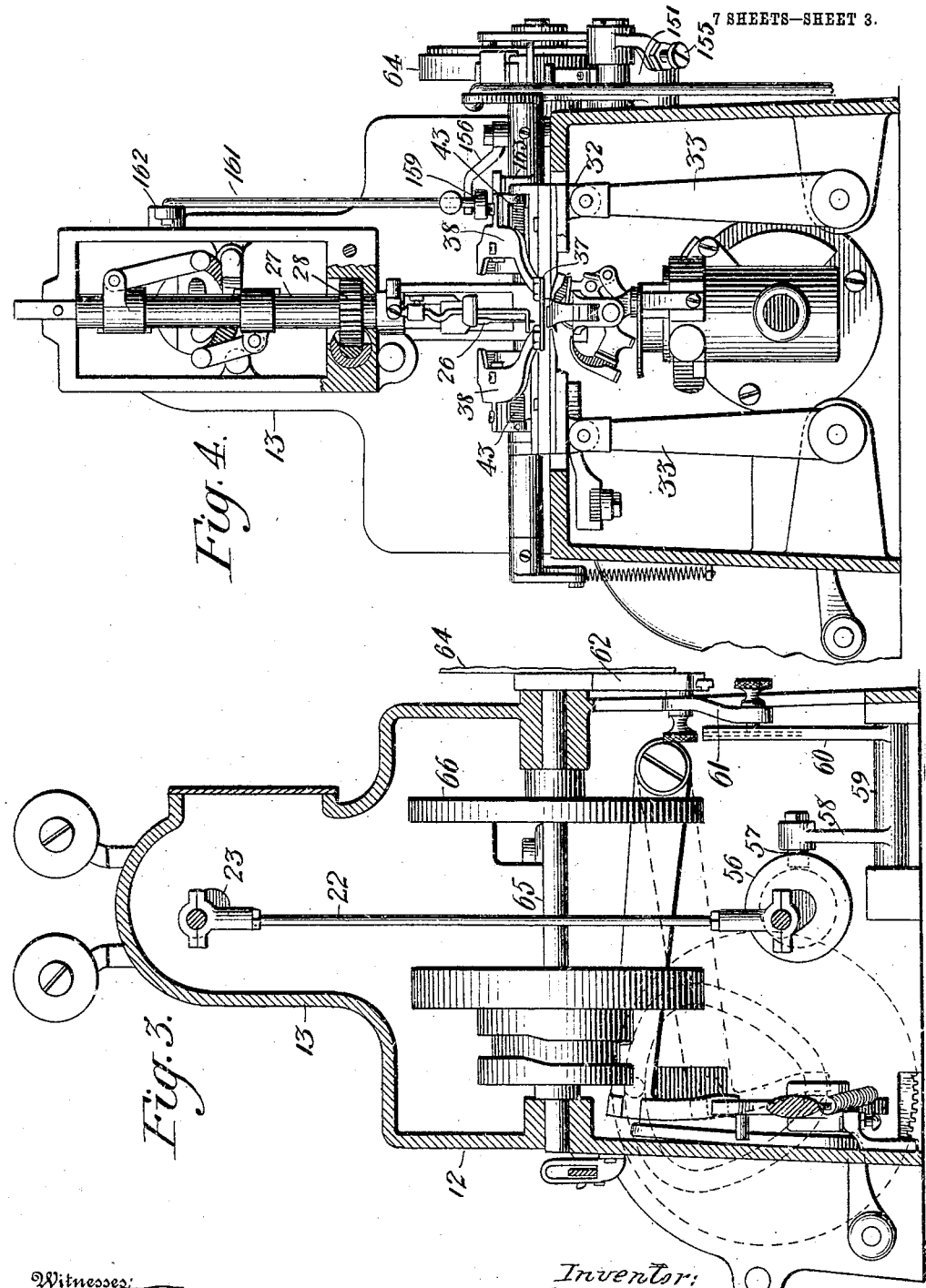

No. 864,117. PATENTED AUG. 20, 1907.
E. B. ALLEN.
WORK HOLDING AND FEEDING DEVICE FOR BUTTONHOLE SEWING MACHINES
APPLICATION FILED OCT. 30, 1906.
7 SHEETS—SHEET 4.
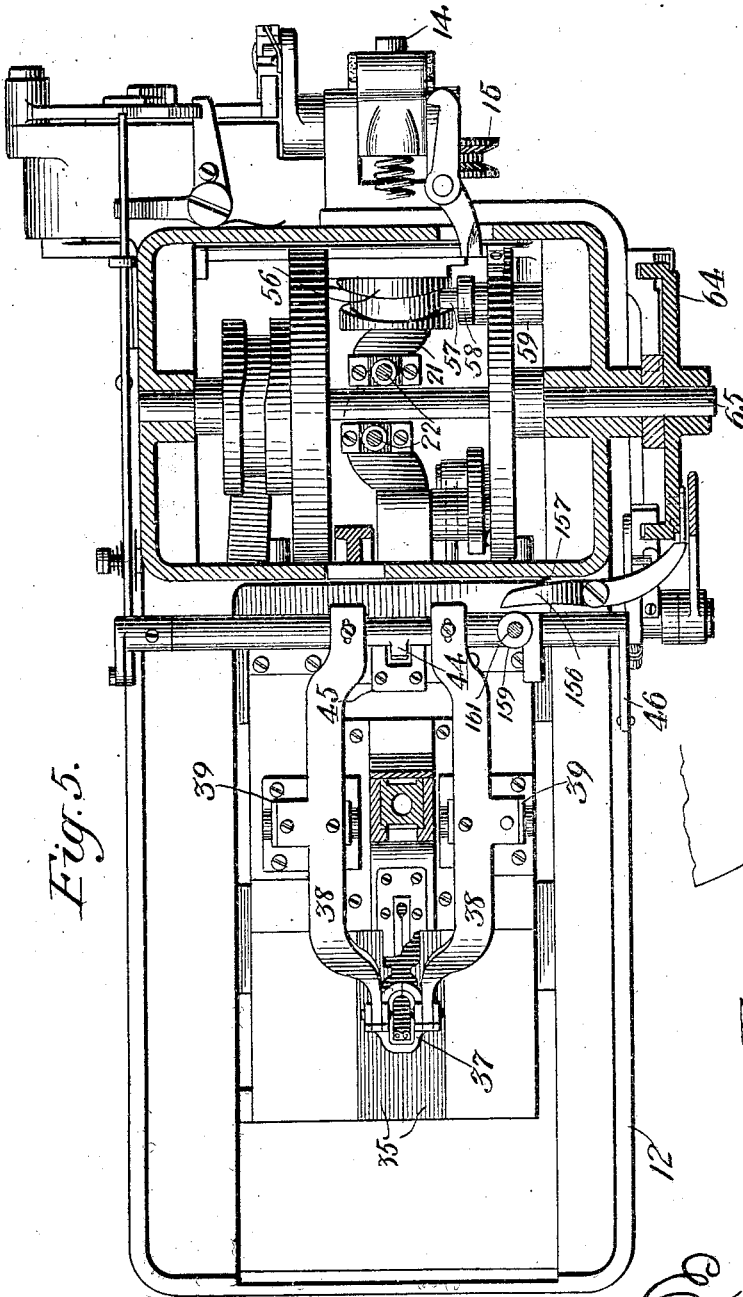
Witnesses
Inventor:
Edward B Allen,
By
Attorney.

No. 864,117. PATENTED AUG. 20, 1907.
E. B. ALLEN.
WORK HOLDING AND FEEDING DEVICE FOR BUTTONHOLE SEWING MACHINES.
APPLICATION FILED OCT. 30, 1906.
7 SHEETS—SHEET 5.
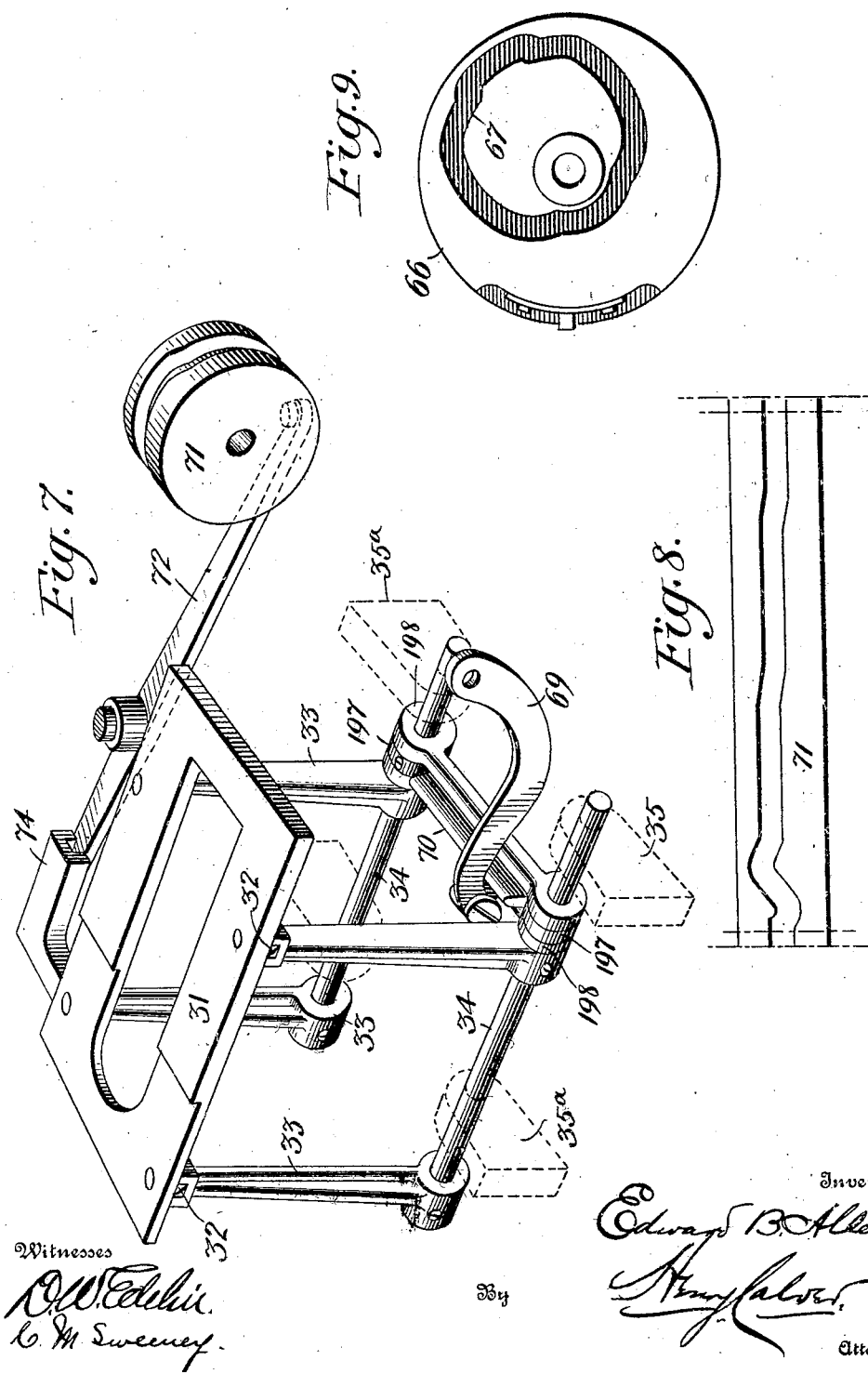

No. 864,117. PATENTED AUG. 20, 1907.
E. B. ALLEN.
WORK HOLDING AND FEEDING DEVICE FOR BUTTONHOLE SEWING MACHINES.
APPLICATION FILED OCT. 30, 1906.

7 SHEETS—SHEET 6.

Witnesses
Inventor:
Edward B Allen
By
Attorney

No. 864,117. PATENTED AUG. 20, 1907.
E. B. ALLEN.
WORK HOLDING AND FEEDING DEVICE FOR BUTTONHOLE SEWING MACHINES.
APPLICATION FILED OCT. 30, 1906.

7 SHEETS—SHEET 7.

Witnesses
Inventor:
Edward B. Allen
By
Attorney.

UNITED STATES PATENT OFFICE.

EDWARD B. ALLEN, OF BRIDGEPORT, CONNECTICUT, ASSIGNOR TO THE SINGER MANUFACTURING COMPANY, A CORPORATION OF NEW JERSEY.

WORK HOLDING AND FEEDING DEVICE FOR BUTTONHOLE-SEWING MACHINES.

No. 864,117.  Specification of Letters Patent.  Patented Aug. 20, 1907.

Original application filed March 7, 1906, Serial No. 304,732. Divided and this application filed October 30, 1906. Serial No. 341,201.

*To all whom it may concern:*

Be it known that I, EDWARD B. ALLEN, a citizen of the United States, formerly of Elizabeth, New Jersey, but now residing at Bridgeport, in the county of Fairfield and State of Connecticut, have invented or discovered certain new and useful Improvements in Work Holding and Feeding Devices for Buttonhole-Stitching Machines, of which the following is a specification, reference being had therein to the accompanying drawings.

This invention relates more particularly to the work-holding and feeding devices of buttonhole stitching machines, and has for its object to provide work-holding and feeding devices, for this class of machines, which will be comparatively simple and inexpensive in construction, and which will require but little power for their operation, as also to guard against any accidental opening of the work-clamp during a buttonhole stitching operation.

A preferred form of the invention has been embodied in the machine adapted for stitching eyed buttonholes fully shown and described in my application, Serial No. 304,732, filed March 7, 1906, but the invention, or some features thereof, may be used in connection with other forms of buttonhole stitching machines than that shown in my said application, and of which the present case is a division.

The machine of my said prior application comprises a stationary frame on which the stitch-forming devices are mounted for periodical rotation and relative to which stitch-forming devices the work-clamp is fed or caused to travel lengthwise of the buttonholes beneath the needles, for properly spacing the stitches; the said work-clamp being mounted on pivoted arms so as to be adapted to be swung laterally in working portions of the eyes of the button-holes and in barring the buttonholes.

Also the present improved machine comprises an automatic button-hole cutting device which, when a button-hole is to be cut, is automatically coupled to a continuously moving lever or part and which is so operated that the cutter is advanced to the work, the button-hole is cut and the cutter is then instantly retracted and automatically uncoupled from its operating device; after which the stitching mechanism is automatically set into operation to stitch and bar a button-hole; and when the working of a button-hole has been completed the machine is automatically stopped, as fully set forth in my said application, No. 304,732.

Figure 2:
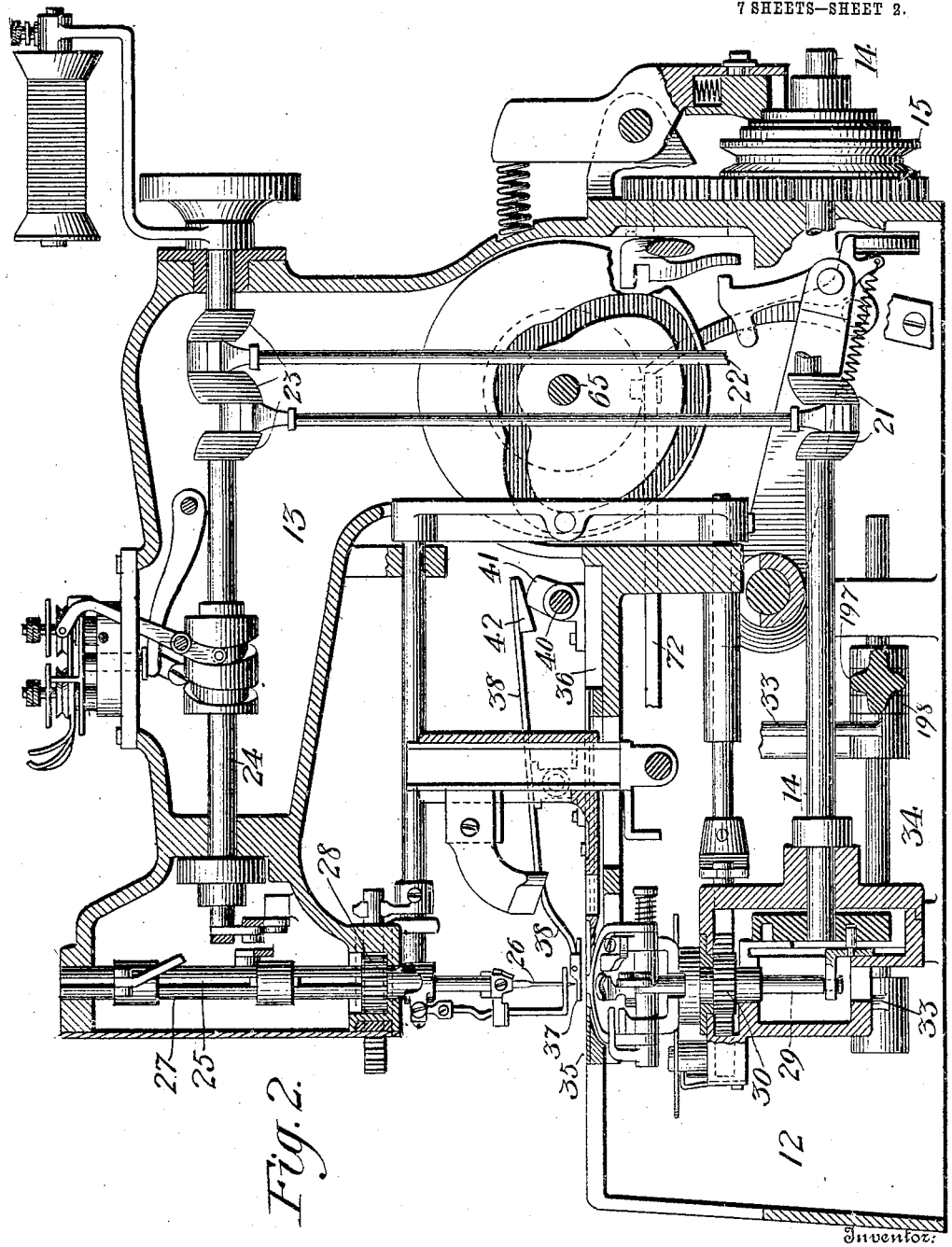
Figure 10:
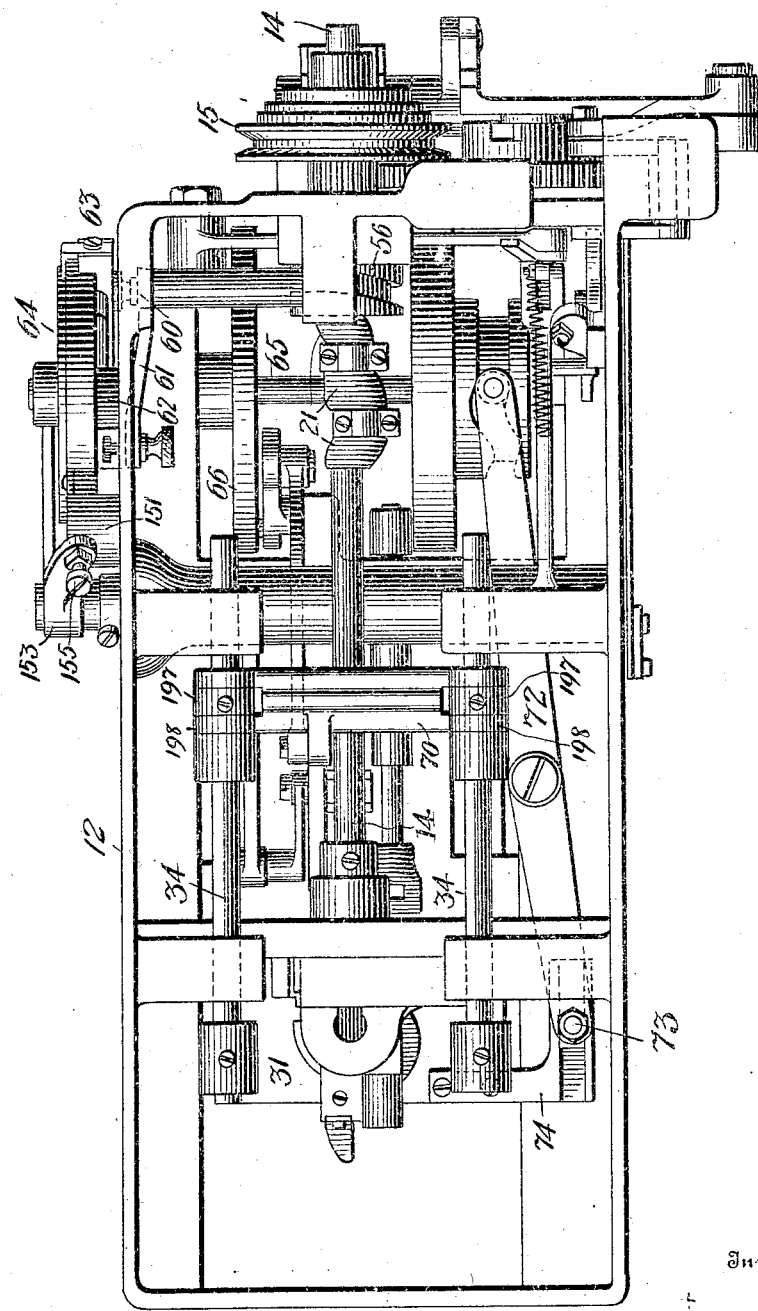
Figure 11:
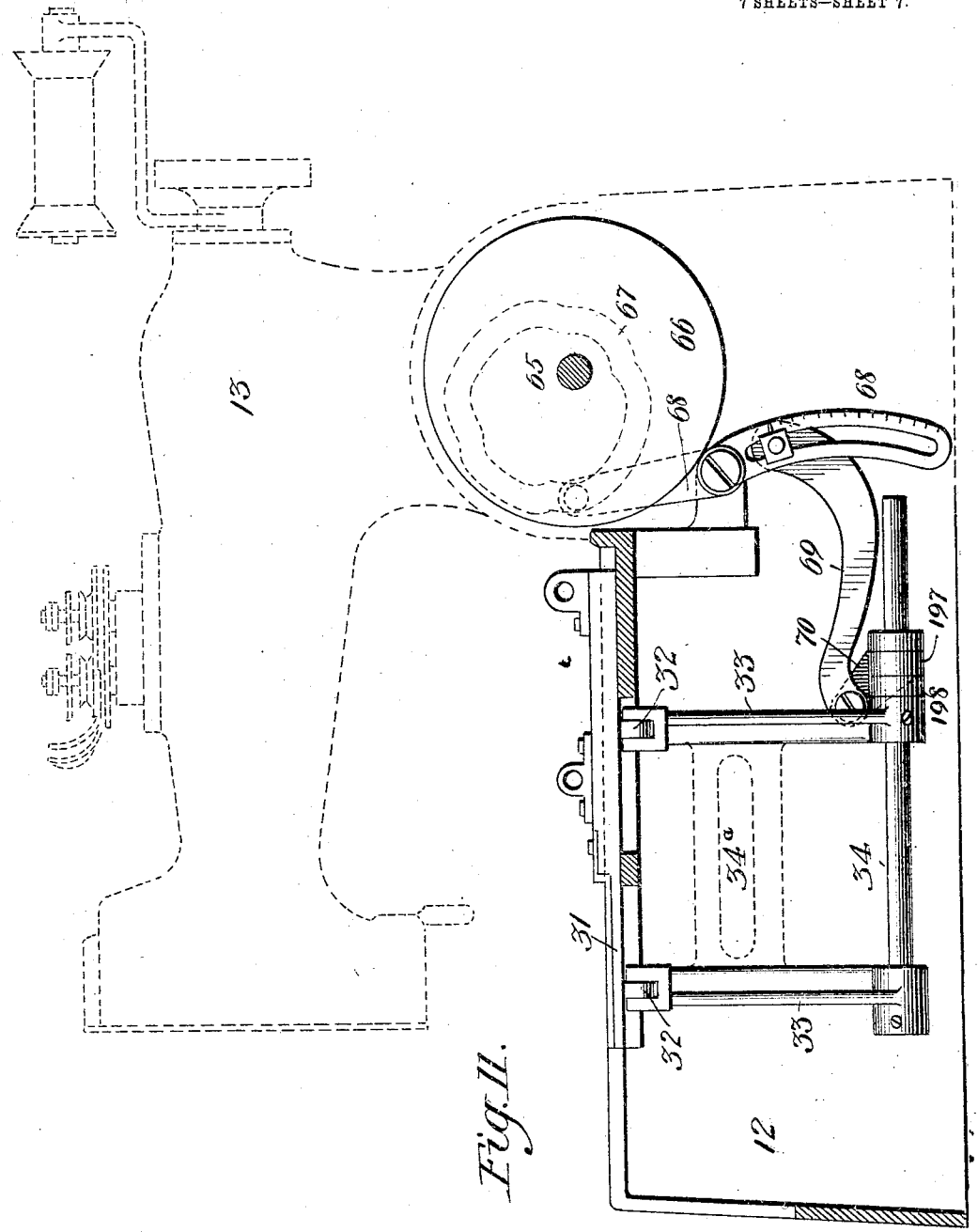

In the accompanying drawings, Figure 1 is a side view of a buttonhole stitching machine embodying the present invention, and Fig. 2 is a vertical longitudinal section of the same. Fig. 3 is a transverse sectional view on the line of the feed shaft, looking toward the rear of the machine. Fig. 4 is a front end view of the machine with the face plate of the head removed, and with the front end of the machine base in section. Fig. 5 is a horizontal sectional view on the line of the feed shaft, looking down. Fig. 6 is a detail view of the frictional feed-controlling device. Fig. 7 is a detail perspective view of the work-support and part of its operating mechanism. Fig. 8 is a diagram or projection of the cam which swings the work-support laterally. Fig. 9 is a detail view of the feed-cam. Fig. 10 is a bottom view of the machine, and Fig. 11 is a sectional elevation, with a portion of the frame of the machine in dotted lines, showing the work-support and part of its operating mechanism.

Referring to the drawings, 12 denotes the base of the machine, and 13 the bracket-arm surmounting said base, said parts constituting the stationary frame of the machine on which the stitch-forming devices are preferably rotatively mounted, so as to be adapted to be turned, and on which the work-supporting and buttonhole cutting devices are movably mounted. Journaled in the said base 12 is the main or driving shaft 14 on which is loosely mounted the driving pulley 15 having a suitable clutch connection with said shaft.

The driving shaft 14 is constructed with twin quartering cranks 21 connected by pitmen 22 with similar cranks 23 on the rotating needle-bar shaft 24 journaled in the upper part of the arm and provided at its forward end with cranks connected by pitmen with two out-of-time needle-bars 25 carrying needles 26; said needle-bars being operated in the manner fully set forth in U. S. Patent No. 739,132, granted Sept. 15, 1903. The needle-bars 25 reciprocate vertically in a rotatable guide 27 suitably mounted in the head of the machine, as fully set forth in U. S. Patent No. 734,794, granted July 28, 1903, and said guide is provided with a pinion 28 by which it may be rotated.

The loop-taking devices coöperating with the needles 26 are operatively connected with the forward end of the shaft 14 and are preferably the same in construction and operation as the loop-taking devices fully shown and described in said U. S. Patent No. 734,794, said loop-taking devices being mounted on a rotatable carrier 29 provided with a pinion 30 by which it may be turned.

The work-support comprises a plate or table 31 having depending ears 32 by which it is jointed to the upper ends of swinging arms 33 attached to sliding rods 34 longitudinally movable in lugs or supports 35ª on the base 12. By thus mounting the said work-supporting plate or table on horizontal pivots at each side thereof, and which pivots connect the said depending ears 32 with the upper ends of the said swinging arms 33, the said plate or table may be maintained in a perfectly horizontal position as it is swung laterally, which would not be the case if the said plate or table were rocked on a single pivotal center of motion. In practice the arms 33 on each side of the work-supporting frame will preferably be connected by one or more longitudinal bars 34ᵃ, as shown in dotted lines in Fig. 11, to strengthen and steady the said work-supporting frame. The lower clamp-plates 35 are attached to plates 36 mounted on the table 31 and adapted to be moved laterally towards and from each other in a well-known manner, by any suitable means, for the purpose of spreading the work after a button-hole has been cut. The upper clamping plates or clamping feet 37 are carried at the forward ends of clamp-arms 38 attached to rocking blocks 39 pivotally mounted on plates or blocks 40ᵃ secured to the plates 36. Journaled in suitable bearings at the rear ends of the plates 36 is a rock-shaft 40 provided with cams 41 against which blocks 42 at the rear ends of the clamp arms 38 are pressed by the stress of torsional springs 43 at the pivots of said arms; said springs thus serving to open the clamp by lifting the forward ends of said clamp arms when the clamp-closing cams on the rock-shaft 40 are in such position as to permit the clamping-plates or feet 37 to be lifted by said springs. The said shaft 40 is also provided with a small arm or tappet 44 to engage a clamp-spreader operating-plate 45, which, however, forms no part of the present invention. The rock-shaft 40 is provided at one end with an arm 46 to be connected by a rod 47 with a suitable heel-and-toe treadle for the purpose of turning the said rock-shaft to close and open the clamp.

The main shaft 14 is provided with a grooved cam 56 entered by a stud 57 on an arm 58 of a rocker 59, said rocker having a second arm 60 to which is adjustably connected one end of a link 61 the other end of which is preferably adjustably attached to a vibrating arm 62 for operating clutch-dogs 63 which impart an intermittent rotation, in a well-known manner, to a wheel 64 fixed to a feed-shaft 65 from which the longitudinal feeding movements and the lateral movements of the work-clamp, as also the rotating or turning movements of the stitch-forming devices are derived. The adjustable connections of the link 61 with the arms 60 and 62 provide for a wide variation of the feed, so that the button-hole stitches may be more or less closely spaced, as may be desirable for different kinds of work. The said shaft 65 carries a fixed cam-wheel 66 provided with a grooved cam 67 entered by a stud at the upper end of a feed-lever 68 to which is adjustably attached one end of a link or pitman 69 the other end of which is jointed to a lug or projection on a cross-bar 70 connected with the rods 34 forming part of the work-supporting frame; so that as the said lever 68 is vibrated the said frame and the work-clamp mounted thereon will be fed back and forth, lengthwise of the buttonholes, beneath the needles of the machine. The lower arm of the feed-lever 68 to which the link 69 is adjustably attached is of sufficient length to provide for a wide adjustment of the lengthwise traveling movements of the work-clamp so that button-holes of varying lengths, from very short to very long, may be stitched on the improved machine. Also fixed to said shaft 65 is a cam-cylinder 71 having a peripheral cam-groove entered by a pin or stud at the rear end of a lever 72 carrying at its forward end a second pin or stud 73 entering a groove in an arm 74 rigid with the table 31 so as to swing the said table and the work-clamp carried thereby laterally when portions of the eyes of the button-holes are being stitched and also in barring said button-holes, such barring being effected at the reverse rotations of the stitch-forming devices, in much the same manner as in the machine of Patent No. 734,794, hereinbefore referred to, excepting that in the present improved machine the work preferably has slight movements, lengthwise of the button-holes, during the barring operations, for the purpose of forming straight cross-stitch bars as shown in U. S. Patent No. 735,433, granted Aug. 4 1903, rather than the radial-stitch bars of said Patent No. 734,794.

In friction feeding devices for button-hole stitching machines it is common to provide a friction check which will prevent the feed-wheel or feed-shaft from overthrowing at high-speeds, so that the feed of the work, and the resulting spacing of the stitches, will be the same whether the machines be run at high or low speeds. In stitching eyed or eyelet-ended button-holes it is, however, desirable to increase the speed of rotation of the feed-wheel when the radiating stitches about the eyelet ends of the button-holes are being formed, to prevent improper crowding of such radiating stitches; and to this end it has been necessary, in many machines, to provide special and more or less complicated mechanisms for varying the feed when stitching the eyelet parts of the button-holes. In the present improved machine this result of increasing the feed, when forming the radiating stitches about the eyelet portions of the button-holes, is effected simply by an automatic release of the friction check which normally prevents the feed-wheel from overthrowing, so that an increase of feed will occur during the time when the stitch-forming devices are performing their rotating movements. To this end a friction block 150, arranged to be pressed against the periphery of the feed-wheel 64, is mounted in a holder 151 within which is also placed a somewhat stiff spring 152 which, when compressed, yieldingly forces said friction-block against said wheel.

Pivoted to the base or frame of the machine is a bell-crank lever 153 the longer arm of which is provided with a stud entering a cam-groove 154 in the outer face of the feed-wheel 64, and the shorter arm of said lever carries an adjustable screw pin 155 projecting through a hole in the holder 151 so as to engage said spring 152 to compress the same against the friction block 150 during the times when the sides of the button-holes are being stitched; said lever being operated so that the pressure of the screw-pin 155 against said spring 152 is released when the radiating stitches about the eyes of the button-holes are being formed, and preferably also during the reverse rotation of the stitching devices when barring stitches are being made; the feed being very considerably greater (nearly double) when the pressure of the friction-block against the feed-wheel is relaxed by the proper releasing operation of said lever by said cam.

In the present improved machine in which the starting device is tripped when the work-clamp is closed, and also in which the cutting device is controlled by the starting device, the clamp should be held closed during a complete button-hole stitching operation, for the reason that if the clamp should be accidentally opened and again closed during such stitching operation the cutting device might be thrown into action and, by interfering with the stitching devices, might damage the latter. To guard against any such disastrous accident an automatic device for locking or holding the clamp closed during a stitching operation is provided. To this end the machine comprises a clamp locking lever 156 which is moved to and retained in locking position by a spring 157; and the feed wheel 64 is provided with a cam or projection 158 to engage the outer arm of said lever, to release it from locking position, when the stitching of a button-hole has been completed.

In the present instance, the locking lever is so arranged that its inner end, when in locking position, is above and closely adjacent the collar 159 of a foot-piece 160 attached to a rod 161 connected to the tension-releasing lever 162, said foot-piece resting on a tension-releasing cam 163 on the work-clamp opening and closing rock-shaft 40; so that when the inner end of said locking lever is above said collar it will prevent said rock-shaft from being turned to open the clamp; but when the cam projection 158 on the feed-wheel engages the outer arm of said clamp-locking lever the inner arm thereof will be withdrawn from above said collar and the clamp may then be opened. It will be understood, however, that the automatic clamp-locking device might be differently constructed and arranged without departing from this feature of the invention.

The side swinging work-support or table 31, on which the work-clamp is mounted, is an important feature of the improved machine in that it affords a construction in which the lateral movements of the work may be effected with the greatest ease and without appreciable friction; while the entire traveling work-supporting frame is light and strong and is movable lengthwise of the button-holes with very little friction, as the rocking and sliding rods 34 move very easily in their bearing lugs or supports 35ª. To permit the said rods to rock freely relative to the cross-bar 70, to which the operating pitman 69 is attached, the said cross-bar is forked at its ends to embrace collars 197 which are secured to and rock with said rods; while the latter are free to rock in the forks 198 of said bar. The entire longitudinally movable and laterally swinging work-supporting frame, while light and strong and easily operable, is also of such construction that it may be made at a low cost, thus combining ease and efficiency of operation with economy in making.

It will of course be understood that the present invention is not limited to the details herein shown and described, as such details may be varied widely without departing from the spirit of the invention.

Having thus described my invention I claim and desire to secure by Letters Patent:—

1. In a button-hole stitching machine, the combination with stitch-forming devices, of a longitudinally reciprocating work-support or table which is mounted on horizontal pivots so as to be adapted to be swung laterally, a work-clamp mounted on and movable with the said work-support or table; and means for reciprocating the said work-support or table longitudinally, and for swinging it laterally.

2. In a button-hole stitching machine, the combination with stitch-forming devices and a work-holder, of a feeding mechanism for the said work-holder, a friction device for preventing the said feeding mechanism from overthrowing, and automatic means for periodically releasing said friction device when it is desired to increase the feed.

3. In a button-hole stitching-machine, the combination with turning stitch-forming devices and a work-holder, of a feeding mechanism for the said work-holder, a friction device for preventing the said feeding mechanism from overthrowing, means for imparting periodical turning movements to said stitch-forming devices, and automatic means for periodically releasing said friction device during the times when said turning movements are to occur.

4. In a button-hole stitching machine, the combination with stitch-forming devices and a work-clamp, of automatic means, independent of the clamp closing and opening means, for positively locking said clamp in closed position during a button-hole stitching operation and for releasing the locking device when the stitching of a button-hole has been completed.

5. In a button-hole stitching machine, the combination with stitch-forming devices, of a work-supporting frame comprising sliding rods mounted for lengthwise movements on the machine frame, arms attached to said sliding rods, a work-support or table having jointed connections with the upper ends of said arms, and automatic means for swinging said work-support or table laterally and for feeding said work-supporting frame longitudinally.

6. In a button-hole stitching machine, the combination with stitch-forming devices, of a work-supporting frame comprising sliding rods mounted for lengthwise movements on the machine frame, arms attached to said sliding rods, a work-support or table having jointed connections with the upper ends of said arms, a work-clamp mounted on said work-support or table, and automatic means for swinging said work-support or table laterally and for feeding said work-supporting frame longitudinally.

7. In a button-hole stitching machine, the combination with stitch-forming devices, of a work-supporting frame comprising vertically disposed, swinging arms and a work-support or table having jointed connections with the tops of said arms, and automatic means for swinging said work-support or table laterally and for feeding said work-supporting frame longitudinally.

8. In a button-hole stitching machine, the combination with stitch-forming devices, of a work-supporting frame comprising vertically disposed, swinging arms and a work-support or table having jointed connections with the tops of said arms, a work-clamp mounted on said work-support or table, and automatic means for swinging said work-support or table laterally and for feeding said work-supporting frame longitudinally.

9. In a button-hole stitching machine, the combination with stitch-forming devices, of a laterally swinging and longitudinally reciprocating work-support or table mounted on horizontal pivots at its opposite sides so that said work-support or table will be maintained in a correct horizontal position throughout its lateral swinging movements, a work-clamp mounted on and movable with said work-support or table, and means for swinging said work-support or table laterally and for reciprocating the same longitudinally.

In testimony whereof I affix my signature, in presence of two witnesses.

EDWARD B. ALLEN.

Witnesses:
F. W. OSTROM,
E. L. TOLLES.